Jan. 23, 1962 W. McK. MARTIN 3,018,184
ASEPTIC CANNING PROCESS AND APPARATUS
Filed Dec. 23, 1958 7 Sheets-Sheet 3

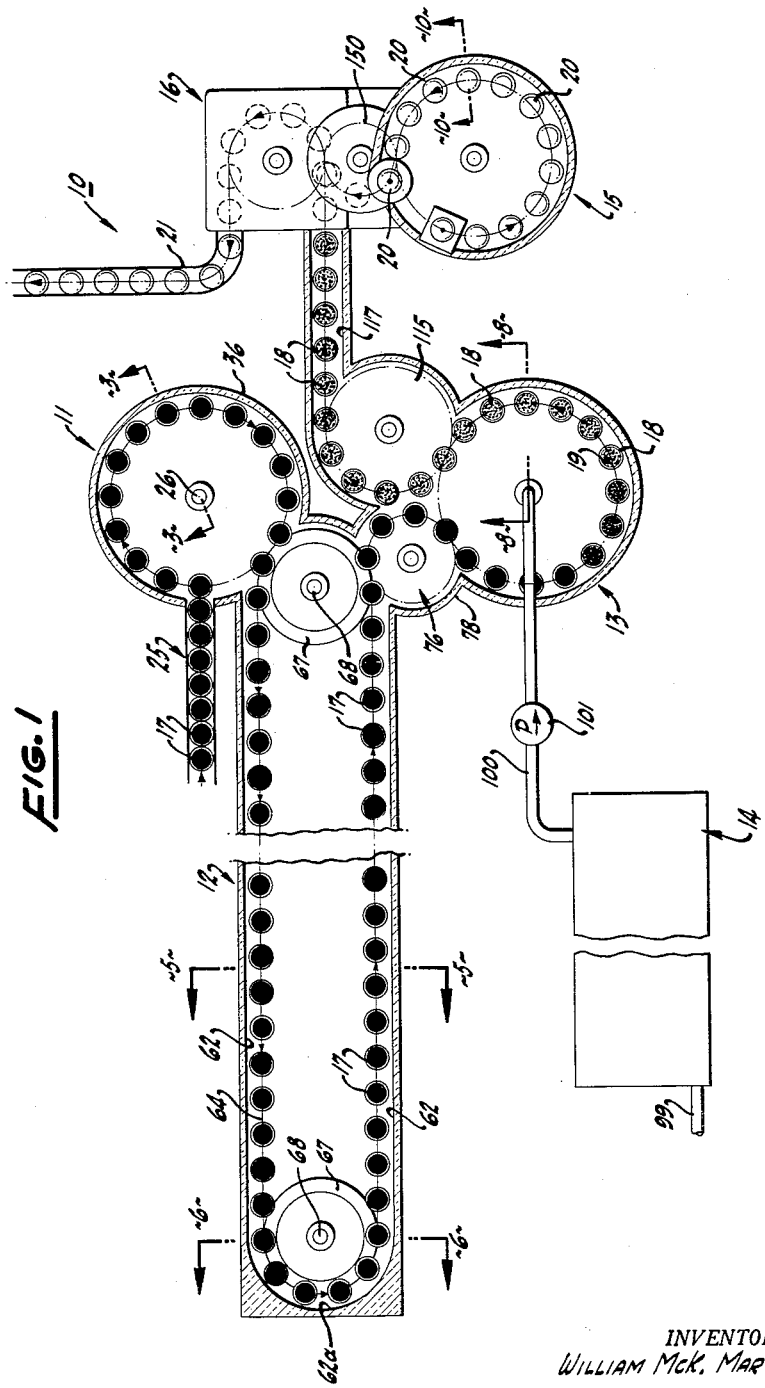

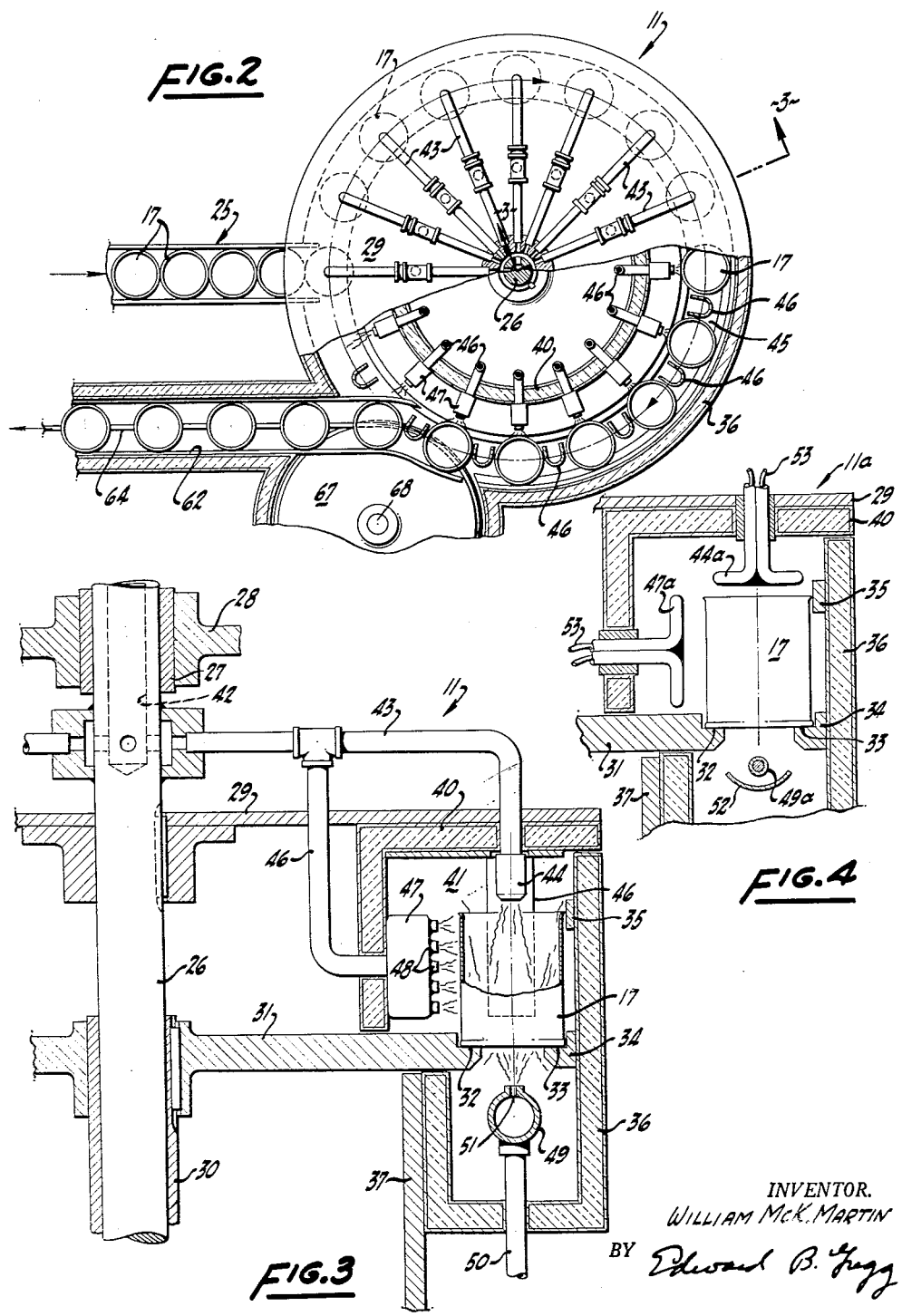

INVENTOR.
WILLIAM McK. MARTIN
BY Edward B. Gregg
ATTORNEY

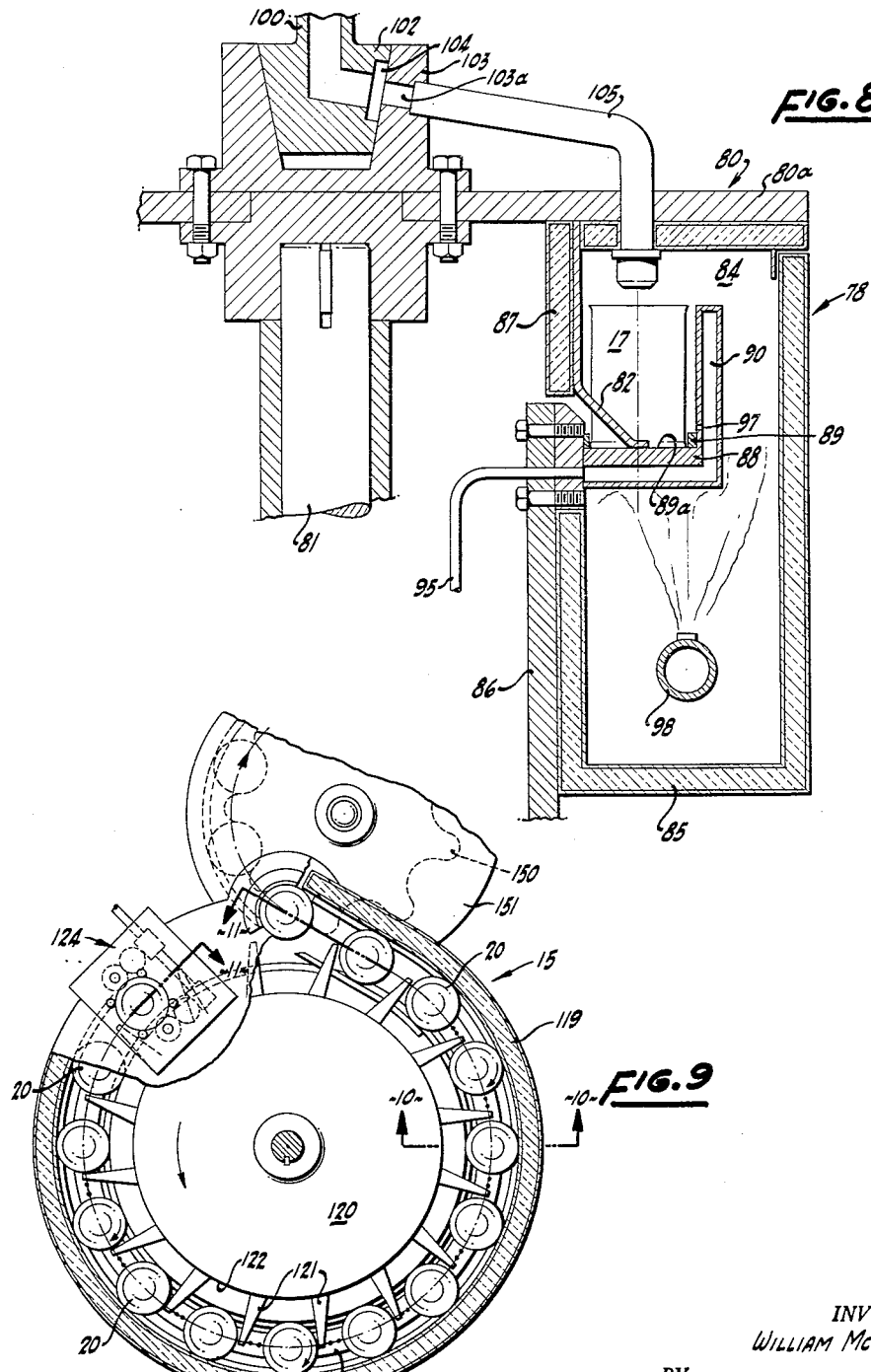

Jan. 23, 1962 W. McK. MARTIN 3,018,184
ASEPTIC CANNING PROCESS AND APPARATUS
Filed Dec. 23, 1958 7 Sheets-Sheet 5

INVENTOR.
WILLIAM McK. MARTIN
BY
Edward B. Gregg
ATTORNEY

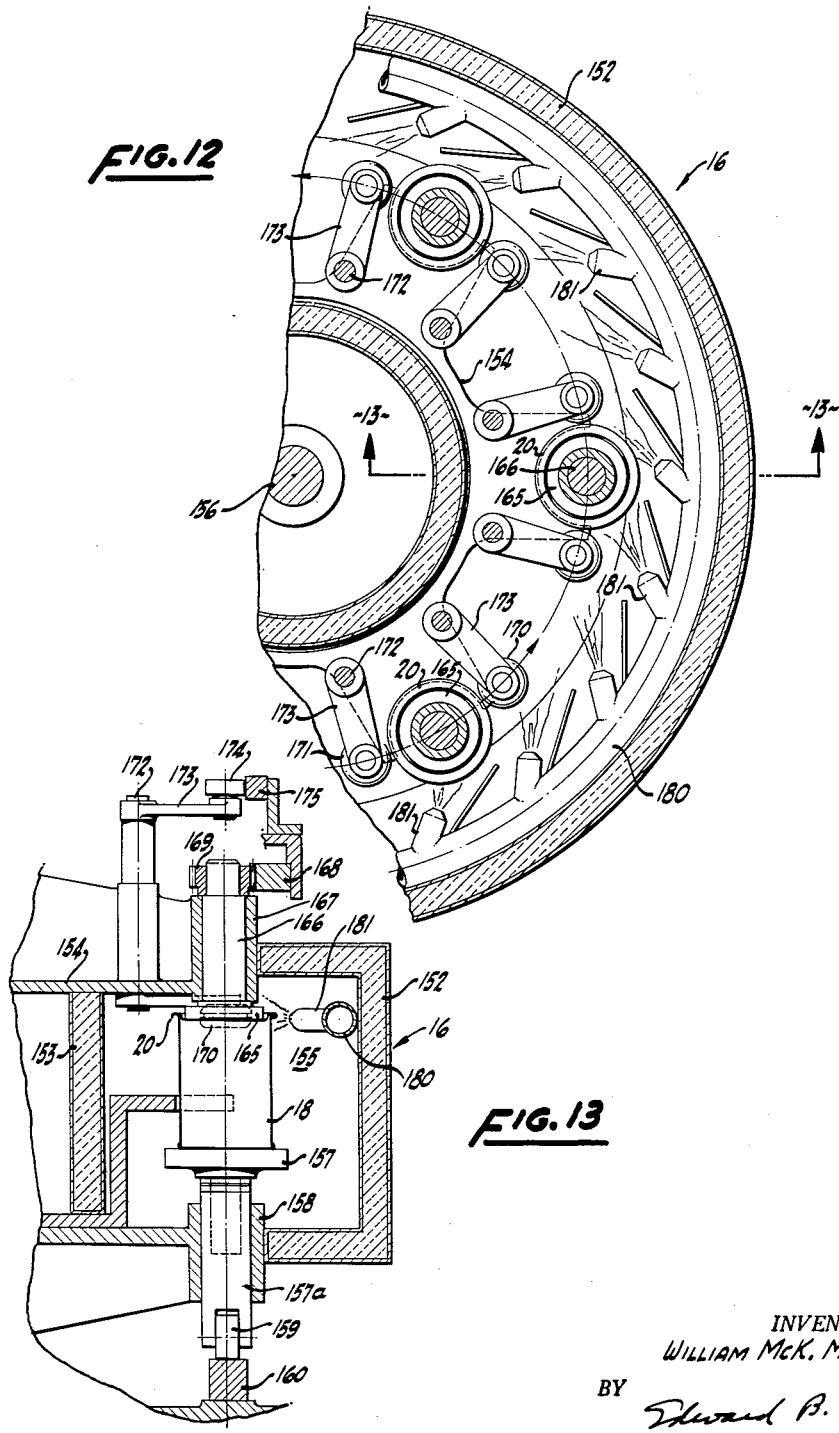

Jan. 23, 1962 W. McK. MARTIN 3,018,184
ASEPTIC CANNING PROCESS AND APPARATUS
Filed Dec. 23, 1958 7 Sheets-Sheet 7
FIG. 14
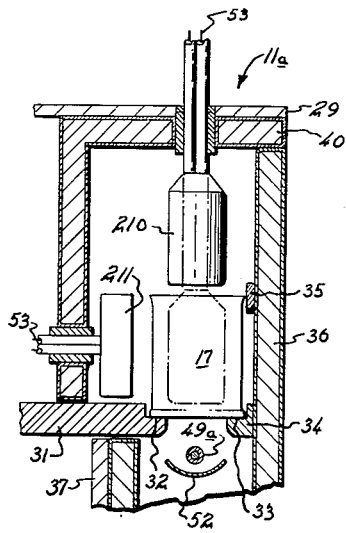
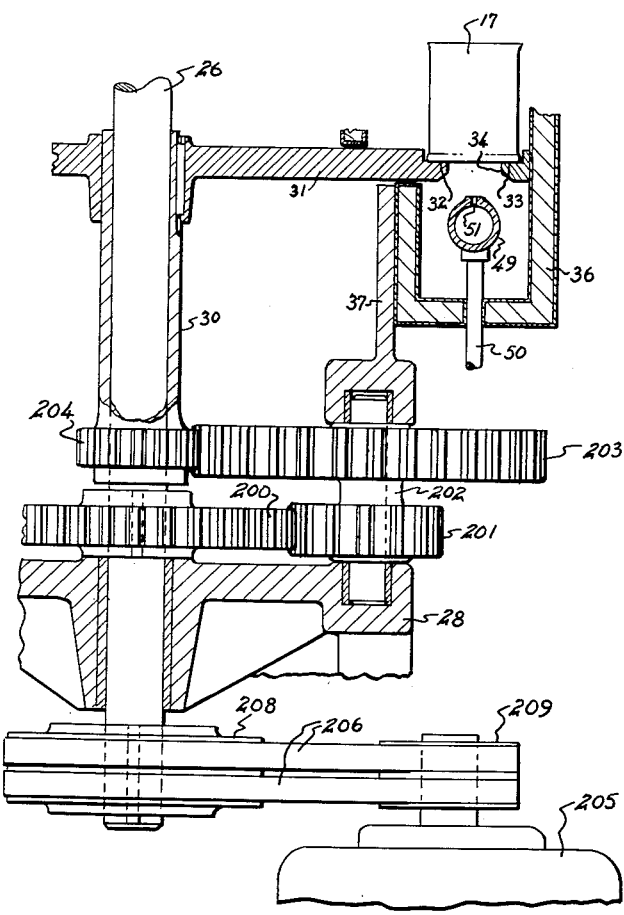
FIG. 15
INVENTOR
WILLIAM McK. MARTIN
BY
ATTORNEY

United States Patent Office 3,018,184
Patented Jan. 23, 1962

3,018,184
ASEPTIC CANNING PROCESS AND APPARATUS
William McK. Martin, 457 Virginia Ave.,
San Mateo, Calif.
Filed Dec. 23, 1958, Ser. No. 782,994
39 Claims. (Cl. 99—182)

This invention relates to a method and to apparatus for canning presterilized food products. More particularly, the invention relates to a method and to apparatus for sterilizing the containers before the food is placed in them and for sterilizing the container covers before they are added to the containers. This application is a continuation-in-part of application Serial Number 478,996, filed December 31, 1954, now abandoned.

By filling sterile containers with presterilized (or pre-cooked and presterilized) food and then closing them with sterile covers, the closed, sealed containers contain no live bacteria, and the food is not subject to spoilage or putrefaction. Yet the necessity of sterilizing and thereby overcooking the food after it has been placed and sealed in the containers is avoided. Prior canning systems of this type sterilize the containers and the covers with steam. The sterilizing steam is heated externally of the several chambers and is caused positively to flow into and through sterilizing chambers, where the containers and covers are treated.

Among the disadvantages of the prior system is the fact that considerable heat energy is wasted. Thus, if steam is heated efficiently in a boiler to a sterilizing temperature it will be under super-atmospheric pressure; its pressure must then be reduced before the steam can be introduced into the sterile canning system which is at atmospheric pressure. Such pressure reduction cools the steam and requires reheating at atmospheric pressure, which is wasteful of heat energy and which requires bulky and/or expensive reheating equipment.

One object of the present invention is to provide a method and an apparatus for canning food products which avoids the need for heating a sterilizing gas externally of the sterile sterilizing, filling, and closing chambers.

Another object of the invention is to avoid the necessity of positively establishing and maintaining a flow of sterile gas through the various chambers of the canning system.

Still another object is to provide a canning system wherein the heat required for sterilizing containers and covers is generated in situ rather than externally of the sterilizing zones.

Another object of the invention is to provide a method and an apparatus of sterilization which employs a flame as a direct source of heat to accomplish sterilization of containers and covers and to create aseptic conditions.

Yet another object is to provide a system wherein electricity may be employed efficiently for sterilizing containers and covers.

A further object is to provide more rapid and more compact sterilizing means for sterilizing containers and covers.

These and other objects of the invention will be apparent from the ensuing description and the appended claims.

In the drawings:

FIG. 1 is a somewhat diagrammatic top plan view of apparatus embodying the principles of the invention and including a container sterilizer, a cover sterilizer and feed, a temperature equalizer and holding unit, a filling unit, and a closing unit.

FIG. 2 is a top plan view on an enlarged scale of the container sterilizer, with the cover partly broken away.

FIG. 3 is a view in vertical section taken along the line 3—3 of FIGS. 1 and 2 and on a still larger scale.

FIG. 4 is a fragmentary view similar to FIG. 3 of a modified form of the container sterilizer also embodying the invention. Here, electrical heating elements are employed instead of gas burners.

FIG. 8 is a fragmentary, vertical sectional view taken along the line 8—8 of FIGS. 1 and 7, and on a still larger scale showing the filling unit.

FIG. 9 is a fragmentary view on an enlarged scale of the container cover feed and sterilizer of FIG. 1, but with the cover portion removed to reveal the interior.

FIG. 12 is a fragmentary view of the closing unit, on a larger scale than in FIG. 1 and showing the interior of the closing unit partly in top plan and partly in horizontal section, and with the cover removed to reveal the interior.

FIG. 13 is a fragmentary, vertical sectional view taken along the line 13—13 of FIG. 12.

FIG. 14 is a view in vertical section similar to FIG. 3 showing one means of rotating the plate 31 at twice the speed of shaft 26.

FIG. 15 is a view in vertical section similar to FIG. 4 embodying a modification of the electric heater.

Figure 5:
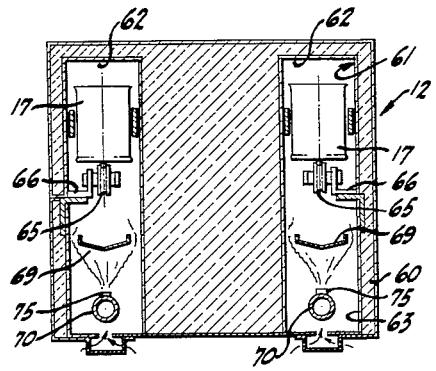
FIG. 5 is a view in vertical section on an enlarged scale, taken along the line 5—5 of FIG. 1 and showing the temperature equalizing and holding unit.

FIG. 1 shows a canning system 10 comprising a container sterilizer 11, a temperature equalizing and holding unit 12 (which may be considered as an extension of the container sterilizer 11), a filling unit 13 supplied with sterile food from a food sterilizer 14, a cover sterilizer and feeder 15, and a container closing unit 16.

Empty containers 17 enter the sterilizing unit 11 and pass through the temperature equalizing and holding unit 12 into the filling unit 13. The containers 17 may be cans, as illustrated, or other types compatible with the process. Filled containers 18 containing a food product 19 are conveyed to the closing unit 16. Meanwhile, container covers 20 are sterilized in the cover sterilizer and feeder 15 and are then fed to the closing unit 16, applied to the filled containers 18, and sealed thereto. Sealed containers 21 emerge from the apparatus.

The empty, unsterilized containers 17 are supplied to the container sterilizer 11 by a feed means 25, which may be a gravity-fed inclined chute or may include positive feed means, such as an endless cable conveyor or chain with dogs for engaging the can bodies, a worm type of feed, or any other suitable means, all of which are well known in the art.

As shown in FIGS. 2 and 3, the container sterilizer 11 includes a central shaft 26 journaled in a bearing 27 of a frame member 28. The shaft 26 is fixed to and extends through a cover member 29 which rotates with the shaft 26. A sleeve 30 is concentric to and rotatable on the shaft 26, and to its upper end is fixed a rotating guide wheel 31.

The shaft 26 and sleeve 30 are driven by suitable driving means (FIG. 15) at different speeds, for a purpose explained hereinafter. The periphery of the guide wheel 31 is formed with a shoulder or ledge 32 for supporting one side of a container 17. Another ledge 33 provided by a stationary guide ring 34 supports the opposite side of the container 17, and another stationary guide ring 35 is positioned above the guide ring 34. The stationary guide rings 34 and 35 are fixed to an insulated annular wall 36, the vertical cross-section of which is J-shaped. The wall 36, in turn, is supported by a frame member 37. An annular wall and cover 40 are fixed to the rotating cover 29 and, together with the fixed wall 36, form an annular sterilizing passage 41.

In the present invention, heat for sterilization is supplied directly to the containers 17, but not by conducting a hot gas such as superheated steam into the passage 41. In the embodiment shown in FIGS. 2 and 3, a suitable fuel gas-air mixture is conducted from a suitable source through a rotary seal (not shown) to an axial passage 42, thence through each of a series of radial pipes 43 to an equal number of burner tips 44. Each tip 44 is in registry with a pocket 45 formed by fingers 46 that project from the wall 40. The containers 17 are conveyed to the wheel 31 in timed relation so that one container is deposited in each pocket 45 as that pocket rotates into registry with the container feed 25. Hence, there is a burner tip 44 in registry with and above each container 17. Also, a series of branch pipes 46b connect with a series of burners 47b having jet holes 48 located adjacent the walls of the containers 17 at each pocket 45. Also, an annular ribbon burner 49 is supplied with fuel gas and air through one or more pipes 50 and has orifices 51 located beneath and in registry with the bottoms of the containers 17.

In operation of the sterilizer 11, each empty container 17 is deposited by the infeed 25 on the ledge 32 of guide wheel 31 in one of the pockets 45 in registry with a burner tip 44. Both the shaft 26 and sleeve 30 rotate and move containers 17 through the sterilizing passage 41. Fuel as a gas-air mixture is supplied to the burners 44, 47b, and 49 and the sterilizing chamber 41 is brought up to operating temperature by means of these burners, or by other suitable means. Each container is rotated about the axis of shaft 26 through an angle of, say, 340° before it is delivered to the holding and equalizing unit 12. During such rotation, flames from the burners 44 play or impinge upon the interior of the container, flames from the burner 47b play or impinge upon the side of the container, and flames from burner 49 play or impinge upon the bottom of the container.

As explained hereinabove, the sleeve 30 and the guide wheel 31 rotate at a different speed from the shaft 26, preferably at about twice the angular velocity of the shaft 26, hence of the fingers 46. This may be done by driving the shaft 26 directly, as by a motor (not shown), or indirectly as by a pulley 209 connected to a motor 205 which drives the shaft 26 through belts 206, and the pulley 208, in turn, drives the sleeve 30 and the wheel 31 through a gear train (FIG. 15) comprising a ring gear 200 mounted on the shaft 26, idler gears 201 and 203 integral with shaft 202 (which is supported by the frame 37), and ring gear 204 mounted on the sleeve 30, with the ratio of the gears set so that the gear 204 rotates twice as fast as the gear 200. Any engineer knows of many other ways of accomplishing this desired result. As a result, each container 17 will tend to push against its leading finger 46, it will not tend to skid, and it will spin freely about its own vertical axis. Such spinning helps to produce uniform heating of the exterior surface of the container body by the burner 47b and of the container bottom by the burner 49. Meanwhile, flame impinged upon the interior of container 17 by the respective burner 44 heats said interior and, in so doing, expands and expels non-sterile air and heats the remaining gas in the container 17 to sterilizing temperature. This same flame also heats the inner surfaces of the container 17.

FIG. 4 shows a modified form of container sterilizer 11a. Those parts identical with parts in FIG. 3 have the same reference numerals. However, in place of the gas burners 44, 47b, and 49, electrical heating elements 44a, 47a and 49a are employed to incandesce and radiate heat directly to the interior of the container, its exterior side walls, and its bottom. A reflector 52 is shown for the element 49a, and other reflectors (not shown) may be employed for the electrical heating elements 44a and 47a, if deemed necessary or desirable. Also, suitable wiring connections 53 are provided.

Instead of radiant heating from incandescent heating elements, other electrical heating means may be used, e.g., infra red heating may be used in the same manner as the radiant heating elements or the metal bodies of cans may be heated by inducing electrical current therein. Also, as shown in FIG. 14, a radiant heater 210 may be constructed to reciprocate in and out of the open container 17, as by means of a cam system operating mechanically or electrically, a microswitch connected to a solenoid, or any synchronized means (not shown). Means of inserting and withdrawing the heater from the container are well known, and it is not deemed necessary to show them. Radiant heater 211, however, is mounted in a fixed position on the vertical wall of the cover 40.

Figure 6:
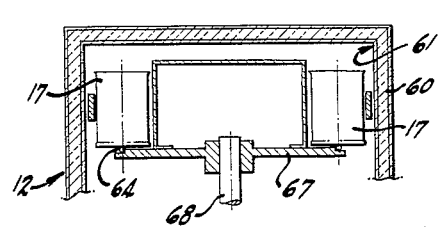
FIG. 6 is a view in vertical section on an enlarged scale taken along the line 6—6 of FIG. 1, through another portion of the temperature equalizing and holding unit.
Figure 6A:
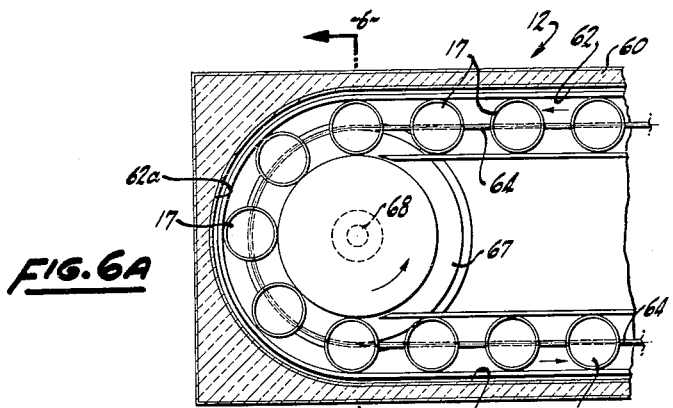
FIG. 6A is a fragmentary plan view of the temperature equalizing and holding unit as seen from above FIG. 6 but with the cover removed.

FIGS. 5, 6, and 6A show the temperature equalizing and holding unit 12 provided with an insulating housing 60. The housing 60 is formed with a U-shaped passageway 61 comprising parallel branches 62 and a connecting portion 62a. The housing 60 is also formed with a U-shaped burner chamber 63 beneath the passageway 61. An endless conveyor cable 64 passes through the passageway 61 and is supported and guided therein by vertically mounted sheaves 65, each of which is rotatably mounted on a bracket 66. The cable 64 is led about two large sheaves 67 that are mounted horizontally at opposite ends of the element 12 on shafts 68, one of which is driven. (See also FIG. 1.) Beneath baffles 69 in the lower burner chamber 63 is a ribbon burner 70 with openings 75 for egress of a fuel gas-air mixture that supplies heat to the passageway 61.

The temperature equalizing and holding unit 12 retains the containers 17 in a heated chamber for a time sufficient to insure sterilization. The containers 17 have been heated to a sterilizing temperature in the sterilizer 11, but sterilization involves a time factor as well as a temperature factor; i.e., a container, to be sterilized with an adequate safety factor, should be held at a suitable high temperature for a certain time. Also, the residence of the containers 17 in the unit 12 insures temperature equalization of side seams and double end seams where there is extra metal thickness.

The sterilizing temperature can be maintained in the unit 12 by other heating means than flame and combustion gas; i.e., it may be maintained by electrical heating elements of the incandescent, radiant, type or by electrical resistance elements, or by steam pipes incorporated into the walls of the housing.

After passage through the unit 12, each sterilized container 17 is picked up by a rotating transfer or indexing mechanism 76 (FIGS. 7 and 8) in pockets 77. The transfer mechanism 76 is rotatable within an outer housing 78 which completely encloses it and other elements of the system, including the filling element 13. Within the housing 78 a rotatable turret 80 is fixed to a shaft 81 and is formed with fingers 82 forming pockets 83 for reception of the sterilized containers 17. The housing 78 (see FIG. 8) forms the outer, stationary wall of an annular filling passage 84. The enclosure of the passage 84 also includes a lower, stationary portion 85 of L-shaped cross section integral with the outer housing 78 and bolted to a frame member 86. The enclosure also includes an upper, rotating portion 87 of right angular cross section which is fixed to and rotates with the turret 80. A shelf or ledge 88 is bolted to the frame member 86 and has an upwardly projecting flange or rim 89 to provide an annular trough, 89a, within which the containers 17 are conveyed. The ledge 88 and the space adjacent the containers 17 and to the right thereof as viewed in FIG. 8 are provided with a jacket 90. Cooling water enters the jacket 90 through an inlet pipe 95 and leaves it through an outlet 96. A plurality of small holes 97, of capillary or near capillary dimensions, is provided to allow a slow leakage of water from the jacket 90 into the trough 89a for a purpose explained below.

As shown in FIG. 1, the food product may be supplied to the product sterilizer 14 through a pipe or tube 99. Food sterilizers are well known and require no detailed description herein; preferably the food sterilizer 14 is of a type which accomplishes sterilization in a short time at a high temperature. The sterilized food is then moved through a tube 100 to the filling unit 13 by a pump 101. The pump 101 is of the positive displacement type and is operated in timed relation to other elements of the apparatus.

Referring again to FIG. 8, the tube 100 terminates in a stopcock valve 102, which is in sealing engagement with a rotating sleeve 103. The valve 102 is formed with an arcuate outlet passage 104 which is a segment only of the circumference of the valve 102. The sleeve 103 has a plurality of openings 103a. Each opening 103a is in registry with a radial tube 105, and there is one tube 105 for each pocket 83, and hence for each container 17 in the filling unit 13. Each radial tube 105 passes downwardly through the cover 80a of the turret 80 and the rotating portion 87 of the enclosure of the passage 84.

To maintain a sterilizing temperature in the filling passage 84, suitable heating means is provided such as an annular ribbon burner 98. Instead of a fuel gas-air burner other heating means may be employed, such as a radiant incandescent electrical heating element, or electrical heating elements, steam piping, etc. may be provided in the walls of the enclosure.

Figure 7:
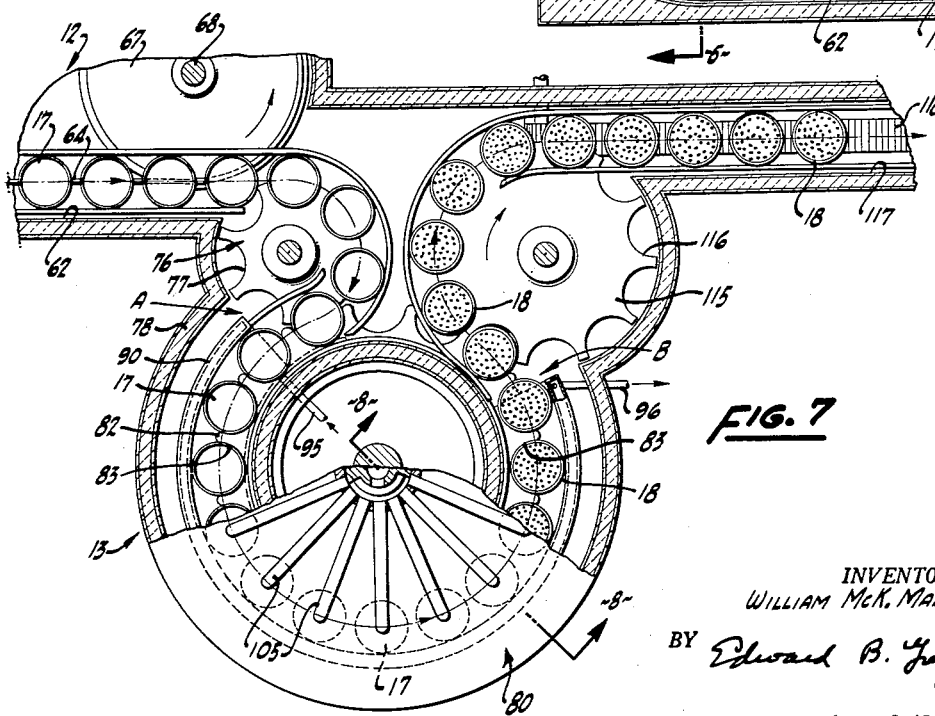
FIG. 7 is a top plan view of the filling unit with the cover partly broken away and on a larger scale than in FIG. 1.

In operation, the whole system is initially sterilized by heat applied for the necessary time-temperature quantum. In the unit 13, this initial sterilization may be done by draining the jacket 90 and then bringing the unit 13 up to operating temperature by heat from the burner 98 or other suitable means. The jacket 90 is then supplied with water. As the containers 17 are conveyed through the sterilizing passage 84 by the turret 80, they are maintained in sterile condition by the heat from the burner 98. Each container 17 is filled with a predetermined quantity of food product by the pump 101, which is operated in timed relation to the turret 80. As shown in FIG. 7, each container is conveyed from a point "A" to a point "B," meanwhile resting on the shelf 88. The construction of the valve 102 and sleeve 103 and the passages formed therein is such that product is delivered to each radial tube 105 between, but only between, the points "A" and "B" after which the valve 102 is closed with respect to that particular tube. The pump 101, being of the positive displacement type and being operated in time with the turret 80, delivers a predetermined volume of sterile product through each tube 105 as it rotates between points "A" and "B."

Meanwhile, water flows continuously through the jacket 90 and cools the containers as they are filling. This cooling reduces the tendency of the product to burn or overheat as it strikes the containers. By having a sterile water supply the small quantity of water which leaks into the trough 89a through holes 97 does not introduce a non-sterile medium. This water introduced into trough 89a assists in cooling the containers, particularly the bottoms, and it flows through the trough and out an open end thereof. This flow of water has the additional advantage that it washes spilled product from the trough and lubricates between the trough and container bottoms.

Referring now to FIGS. 1 and 7, the filled containers 18 are taken from the filler element 13 by a transfer or indexing mechanism 115 having pockets 116, each pocket 116 accommodating one container 18. The pockets 116 are so arranged (see FIG. 7) that each filled container 18 is picked up by one pocket 116 from the corresponding pocket 83 of the filler turret 13 and is then rotated within the housing 78 to a passageway 117. In the passageway 117 each container is picked up by a conveyor 118 and conveyed to the closing element 16, which is described below.

Figure 10:
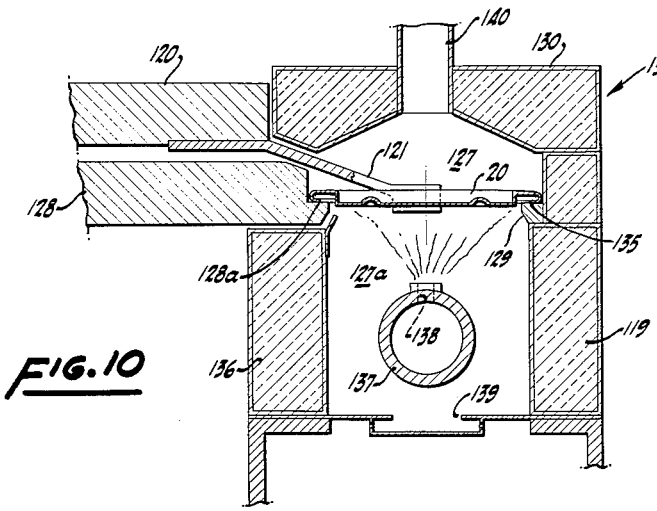
FIG. 10 is a fragmentary, vertical sectional view taken along the line 10—10 of FIGS. 1 and 9, on a still larger scale.
Figure 11:
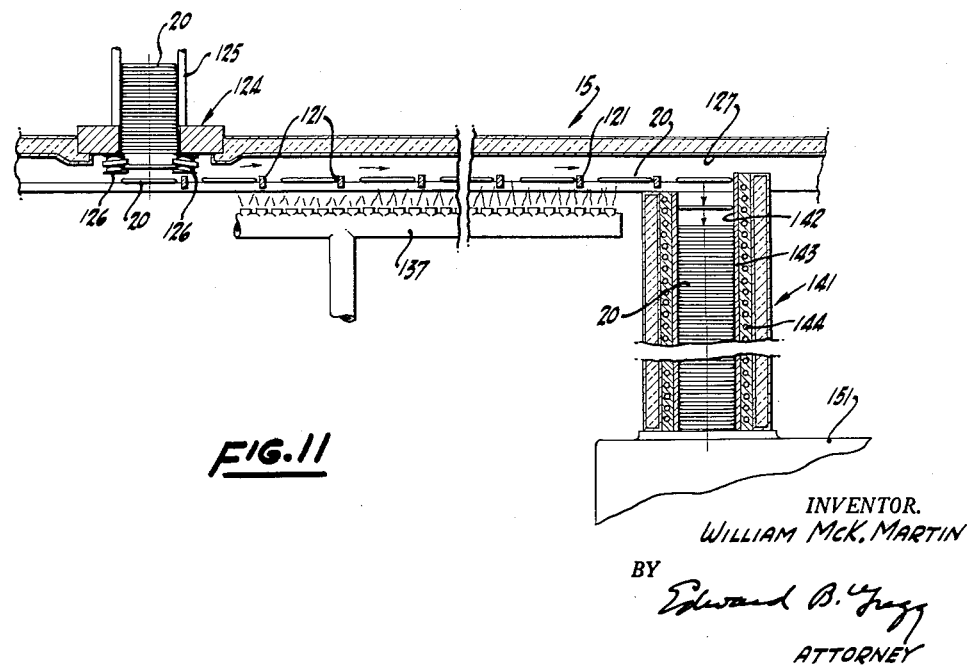
FIG. 11 is a projected view taken along the line 11—11 of FIG. 9.

Referring now to FIGS. 1 and 9-to-11, inclusive, the cover sterilizer and feeder 15 supplies sterile covers to the closing unit 16 in timed relation to the supply of filled containers. The cover feeder and sterilizer 15 is provided with a housing 119 within which a turret 120 is rotatable in a horizontal plane. The turret 120 is provided with radially projecting fingers 121 which form pockets 122 for reception of covers 20. The covers 20 are contained in a magazine 124 which may be of conventional construction and operation. A suitable type of cover feeder for covers of tin cans is illustrated. It comprises a plurality of upright, spaced posts 125 which serve to provide lateral support for a stack of covers 20 (FIG. 11). The covers 20 are stripped one-by-one from the bottom of the stack by means of rotary stripper blades 126, which are of known design, construction and operation, and which, of course, are driven in timed relation to other elements of the system. Each stripped cover 20 is supplied to a pocket 122 of the turret 120 and is rotated through an annular sterilizing passage 127, shown in cross section in FIG. 10. The passage 127 is formed by a rotating guide wheel 128, a stationary guideway 129, and an insulated cover member 130. The rotating guide wheel 128 is provided with a ledge 128a, and the stationary guideway 129 is provided with a similar ledge 135. The wheel 128 is preferably rotated about twice as fast as the turret 120, just as the wheel 31 in FIG. 3 is rotated twice as fast as the turret 29. This is accomplished by means such as a gear train shown in FIG. 15 or other conventional means not needing illustration. It will, therefore, be apparent that the covers 20 will be rotated about the common axis of the turret 120 and wheel 128 and that each cover will also spin freely about its own axis or center.

A downward extension of the sterilizing passage 127 is provided by the housing 119 and an inner insulated wall 136, and within this extension there is provided an annular, ribbon-type burner 137 having openings 138 for issuance of a burning fuel gas-air mixture. An opening 139 is provided at the bottom of the passageway 127a for supplying air to the burner 137, and a flue 140 is provided for escape of combustion gases from the sterilizing passageway 127.

Other sterilizing means for applying heat directly to the covers 20 may be substituted for the gas burner 137. These include, as in the case of the container sterilizer (FIG. 4), an electrical heating element such as a radiant, incandescent electrical element. Also, the covers 20 may be passed through a muffle furnace passage in which the walls of the passage are heated electrically, or the covers 20 may be heated by electrical induction.

The covers 20 are thereby heated to a suitable sterilizing temperature, e.g., 350° or above. As in the case of the containers 17, it is desirable to hold the covers at a sterilizing temperature for a sufficient length of time to insure sterilization. (See FIG. 11.) This holding unit 141 comprises a tubular chamber 142 of insulated construction within which is a guideway 143 to provide a lateral support and to insure proper downward movement of the covers. The chamber 142 is heated by a spiral-wound tube 144 containing saturated steam under pressure, or by an electrical heating element 144 to maintain and hold a sterilizing temperature within the chamber 142. Other suitable heating means may be employed. As shown in FIG. 11, the temperature holding unit 141 receives covers 20 from the sterilizing passage 127, and the covers drop by gravity into chamber 142 and progress downwardly by gravity. However, a positive feed may be provided of any suitable type (not shown), such as an endless chain with dogs or lead screws. Such cover feed devices are well known and require no further description herein. The sterilized covers are taken from the bottom of the stack in chamber 142 by a transfer wheel or indexing mechanism 150 (see FIGS. 1 and 9) which may be of standard construction and which is enclosed in an insulated housing 151.

Filled containers 18 are supplied to the closing unit 16 through a passageway 117 (see FIGS. 1 and 7) and sterilized covers 20 are supplied to the closing unit 16 by transfer mechanism 150. (See FIGS. 1 and 9.) The container and cover feed means are, of course, operated in timed relation so that a cover is delivered to and placed upon the open end of each filled container 18.

FIGS. 12 and 13 show the closing unit 16 somewhat diagrammatically, for it may be of any suitable type of construction. Thus one common type of closing machine frequently called a "double seamer" employs cooperative lifter pads and seaming chucks to clamp filled can bodies and can covers together in proper position for the closing or sealing operation and it also applies seaming rollers to the juxtaposed can body flanges and can cover curls to form the appropriate end seams. One such standard type of closing machine is illustrated somewhat diagrammatically in FIGS. 12 and 13, modified to maintain sterile conditions in the manner described hereinafter.

The closing unit 16 comprises an outer, stationary annular housing 152 and an inner annular wall 153 fixed to a turret 154. Both the housing 152 and wall 153 are of insulated construction and are spaced apart to define an annular closing passage 155. The turret 154 is fixed to and is rotated by a shaft 156. A plurality of lifter pads 157 (see FIG. 13) are rotatable on a shaft 157a. The shaft 157a is slidable in a sleeve 158 which is fixed to the turret 154. At the lower end of each shaft 157a is a cam follower roller 159 which rolls on a lifter cam 160. The cam 160 lifts the pad 157 at the appropriate point in its cycle of operation. Paired with each pad 157 is a seaming chuck 165 which is fixed to a spindle 166 rotatable in a sleeve or bushing 167 fixed to the turret 154. Each spindle 166 is driven by a pinion 169 meshing with a stationary ring gear 168. A pair of seaming rollers 170 and 171 for each chuck 165 accomplish the first and second seaming operations, respectively. Each seaming roller 170, 171 is pivoted into and out of engagement with a can body and can cover by a shaft 172 rotatable in the turret 154, a lever 173, a cam follower roller 174, and a stationary cam 175.

To maintain a sterilizing temperature in the passage 155, and to apply heat to the area surrounding the upper ends of the containers, an annular pipe 180 is provided adjacent the upper ends of the containers, and burner tips 181 project inwardly therefrom closely adjacent the container covers.

In operation, the closing element 16 is brought up to suitable operating temperature by the burners 181 or by other suitable means, and as the closing element 16 applies and seals the covers 20 to the filled containers 18, the flame and hot combustion gases from the burners 181 effectively maintain sterile conditions.

The various elements and parts thereof are operated in timed relation to one another. For example, all the moving parts may be timed by having them driven by a single motor, and gear ratios between the motor and the various elements may be such as to synchronize all parts of the system; e.g., the container sterilizer 11, the container holding unit 12, the product pump 101, the filler 13, the cover sterilizer and feeder 15, and the closing unit 16.

The various elements of the system are housed to prevent free inflow of non-sterile air, but the housing does not require air-tight seals. Heating of the air and other gases in the various chambers and passages and in the empty containers produces a gaseous expansion which maintains an outflow of gas from the system at all times and so minimizes the inflow of air from the outside that the heating means employed rapidly sterilizes any inflowing air. These results are accomplished without the necessity of introducing a sterilizing gas such as steam or combustion gases into the system from external source; of adding sensible heat to the gas introduced; or of establishing and maintaining a positive flow of gas through the system. External heating means and motive means for heating and moving gas are, therefore, eliminated. Condensation of steam in and on containers is avoided without the difficulties involved in the counter measures employed in steam heated systems.

Certain features of adjustability and automatic control can be incorporated in the system of my invention. For example, thermostatic control means may be employed to control the various burners to maintain a suitable operating temperature in the various chambers and passageways; and the burner tips 44 (FIG. 3) may be adjustable for clearance of can bodies of different heights. The entire system, or portions thereof, may be enclosed, and the combustion gases led off through flues or ducts. The system is, of course, brought up to suitable operating temperature; which may differ along different parts of the system, and is held at such temperatures before commencement of operation for a sufficient time to insure that sterile conditions prevail from the start of operation.

Among the numerous distinct and advantageous features of the apparatus and method of my invention, there may be noted the following: heat is generated in situ, thus obviating the necessity of preheating a gas externally of the apparatus, superheating it to sterilizing temperature, and forcing it into and through the system. Flame plays directly into can bodies (FIG. 3) and onto can bodies and can covers (FIGS. 3, 10 and 14); this not only obviates the necessity of providing an external source of gas such as steam, of adding sensible heat to the gas, and of introducing the superheated gas into the apparatus, but the sterilizing operation is accomplished much more quickly. In the flame sterilization shown in FIGS. 3, 10, and 11, the non-sterile air within containers and adjacent the exterior of containers (FIG. 3) and adjacent covers, undergoes combustion, hence is heated in situ. In modifications such as shown in FIG. 4, heat is also generated in situ. This type of heating is very efficient and very rapid in its sterilizing action. Taken in conjunction with the spinning of containers and covers as shown in FIGS. 3, 4, and 10 (which rapidly equalizes the temperature of the containers and covers), this type of heating requires less residence time in the respective sterilizing elements. Accordingly, the system can be constructed more compactly than systems which heat a gas externally and introduce it into the sterilizing elements from without.

It will also be apparent that the various heating elements, such as the gas burners or electrical heating elements, will sterilize mechanical parts of the apparatus which contact the containers, covers, and product. For example, filling nozzles, conveyors, container and conveyor supporting members, seaming chucks and seaming rollers will be rapidly sterilized.

Thus a novel method and novel apparatus are provided for the canning of food and other products, which have the advantages of sterile operation at atmospheric pressure and the avoidance or diminution of difficulties encountered in prior atmospheric systems. Moreover, the invention is applicable to non-food products which require packaging under sterile conditions; e.g., biological preparations.

To those skilled in the art to which this invention relates, many changes in construction and widely differing

I claim:

1. A method for the sterilization and filling of containers for sterile food products comprising: continuously transporting in a sterile atmosphere open, empty, upright containers through a series of four treating zones, all at atmospheric pressure, said treating zones comprising; first, a container heating zone wherein the major portions of said containers are heated to at least a sterilizing temperature; second, a temperature equalizing and holding zone wherein said heated containers are maintained in at atmosphere at said sterilizing temperature for a period of time sufficient to cause all portions of said containers to reach said sterilizing temperature and to sterilize the same; third, a filling zone wherein said heated sterilized containers are filled with presterilized food products; and fourth, a closing and sealing zone wherein said filled containers are covered and the covers subsequently sealed thereto.

2. A method of canning presterilized food product in a sterile atmosphere, comprising: introducing unsterilized open empty upright containers into a sterile area, subjecting said unsterile containers to heat emanating in situ from electrical heating elements, moving said heated containers into a sterile area and maintaining said containers at a sterilizing temperature for a period of time by subjecting said containers to additional heat emanating from electrical heating elements, transporting said heated sterilized containers into a sterile area and filling said containers with presterilized food product, and closing them.

3. In a method for canning presterilized food products, comprising sterilizing empty containers, filling the sterilized containers with presterilized food products, and sealing the filled sterilized containers with sterilized covers, the improvements comprising: maintaining the entire path of travel of the containers from the sterilizing operation through the sealing operation at atmospheric pressure and in a sterile condition, by application of dry heat, generated in situ along said path, in an amount sufficient to preclude any contamination of the area by unsterile air.

4. A method for canning presterilized food products employing in situ heating comprising: heating major portions of a continuous series of open, empty, upright containers to a sterilizing temperature by direct impingement of gas flames onto their surfaces, maintaining these containers at said sterilizing temperature for a period of time sufficient to equalize their temperature and to thoroughly sterilize them, advancing the sterilized empty containers into and through a sterile area and there filling said empty sterile containers with presterilized food products, and closing said filled sterile containers.

5. Apparatus for aseptic canning of presterilized food products and the like at atmospheric pressure, comprising a container sterilizer having means for generating heat in situ closely adjacent the containers and for applying said heat at atmospheric pressure directly to the interior and exterior walls of the containers; a container filler; a cover sterilizer having means for generating heat in situ closely adjacent the covers and applying the heat directly thereto at atmospheric pressure; a container closer; conveyor means causing continuous passage of containers serially through said container sterilizer, said filler, and said closer; means to cause continuous passage of covers serially through said cover sterilizer and closer, wherein said covers are placed on said containers and sealed thereto; and means for maintaining sterile conditions at atmospheric pressure throughout the apparatus until the covers have been applied and sealed to the containers.

6. The apparatus of claim 5, wherein the means for generating heat comprises a series of burners designed to burn combustible gaseous fuel.

7. The apparatus of claim 5, wherein the means for generating heat comprises a series of electrical heating units.

8. The apparatus of claim 5, wherein the cover sterilizer has a chamber with an entrance and an exit and wherein said means for generating heat in situ comprises a continuous heating unit extending substantially from the entrance to the chamber to the exit thereof, positioned beneath the path of the covers and in such a manner that, as the covers travel through the said chamber, the heat emanating from said unit is directed upwardly toward the bottom of the said covers.

9. The apparatus of claim 8, wherein the cover sterilizer chamber contains, means for supporting covers as they travel through the chamber, said means comprising a narrow ledge extending laterally from both side walls of the chamber and spaced apart from each other sufficiently that the major portion of the bottom surface of each lid is exposed to direct heat from the sterilizer heater; and means for rotating said covers as they move along said ledges to expose all of their bottom surface to the heat.

10. An apparatus for canning presterilized food products and the like at atmospheric pressure, comprising: a series of enclosed intercommunicating chambers adapted to heat, sterilize, fill, and seal, in that order, containers for presterilized food in a sterile atmosphere, said series of enclosed chambers comprising, first, a container heater-sterilizer chamber of circular shape having a revolving disc-like plate to transport the containers from the entrance substantially completely around the inside periphery of said chamber to the exit therefrom; a first series of circumferentially spaced in situ heating devices projecting downwardly from the top of the chamber toward the open top of the containers, one device positioned directly above each container; a second series of circumferentially spaced in situ heating devices projecting outwardly from the center of the chamber toward the side walls of the containers, one device positioned adjacent each container; means for moving said first and second series of heating devices synchronously with said containers; and an annular ribbon-type heating device on said stationary housing portion positioned beneath the path of the containers, extending substantially from the entrance to the exit of the chamber and facing upwardly toward the bottoms of the containers; second, a container-holding chamber with its entrance communicating with the exit of the container heater-sterilizing chamber, having an endless conveyor means passing therethrough to transport containers in a continuous manner through the chamber with their bottoms substantially exposed, and a heating device extending substantially the entire length of the chamber and positioned beneath the path of the containers and facing upwardly toward the bottoms of said containers; third, a circular container-filling chamber with its entrance communicating with the exit of the container-holding chamber and with a rotatable circular top carrying circumferentially spaced pockets for continuously receiving sterilized containers from the container-holding chamber and transporting them around the container-filling chamber to the exit thereof, and radially spaced tubular food-dispensing conduits mounted in said rotatable top with their outlet ends positioned immediately above the centers of the said pockets, one conduit for each pocket and synchronized therewith, a generally annular water jacket, L-shaped as seen in vertical cross-section mounted on the side of the container-filling chamber immediately beneath the pockets as a source of horizontal and vertical support for the containers as well as a source of cooling therefor, and a generally annular space heating device for maintaining the sterility of said container-filling chamber; fourth, a circular container closing and sealing chamber with its entrance connected to the exit of the container-filling chamber by an enclosed passageway and containing means for receiving and transporting the filled containers through the said closing and sealing chamber, a series of heating devices positioned circumferentially of the path of the containers and facing the sides of said containers, and means for placing the lids on the containers and sealing them thereto; a source of supply to the filling conduits of sterile food product; and a container-lid sterilizer with its exit closely adjacent and communicating with the entrance to the container closing and sealing chamber.

11. For use in the aseptic canning of presterilized food products, a container heater-sterilizer chamber of circular shape having a stationary housing portion with an entrance and an exit; a revolving disc-like plate to transport the containers from said entrance substantially completely around the inside periphery of said chamber to the exit therefrom; a revolving cover member for said housing portion; a series of in situ heating devices projecting downwardly from said cover member toward the open top of the containers, one device being positioned directly above each container and moving therewith; and a series of in situ heating devices projecting outwardly from said cover member toward the side walls of the containers, one device being positioned adjacent each container and moving therewith.

12. The device of claim 11 having means for rotating said containers as they move through said chamber.

13. For use in the aseptic canning of presterilized food products, a container heater-sterilizer chamber of circular shape having a stationary housing portion with an entrance and an exit; a revolving disc-like plate to transport the containers from said entrance substantially completely around the inside periphery of said chamber to the exit therefrom; a revolving cover member for said housing portion; a series of circumferentially spaced in situ heating devices projecting downwardly from said cover member toward the open top of the containers, one device being positioned directly above each container and moving therewith; a series of circumferentially spaced in situ heating devices projecting outwardly from said cover member toward the side walls of the containers, one device being positioned adjacent each container and moving therewith; and a generally annular ribbon-type heating device on said stationary housing portion positioned beneath the path of the containers, extending substantially from the entrance to the exit of the chamber and facing upwardly toward the bottoms of the containers.

14. A container sterilizer for use in aseptic canning of presterilized products into a sterilized container, including in combination: a support frame; a disc supported rotatably by said frame and having a stepped circular outer periphery providing a narrow ledge; a stationary annular housing, J-shaped in cross section, supported by said frame, having an outer vertical portion spaced radially outwardly from said disc and having a guide ring along its inner wall on a level with said disc and having a stepped circular inner periphery providing a narrow ledge spaced apart from and level with the ledge of said disc so that container edges are supported by and bridge between said ledges with the bottom of the container being largely between said ledges and unsupported, said housing having container inlet means and container outlet means through said outer portion, said housing having an inner shorter vertical portion connected to said outer wall by a bottom wall and extending up nearly into contact with the bottom of said disc; a housing cover member rotatably supported by said frame concentric with said disc generally shaped in cross section like an inverted L with a horizontal portion covering said stationary housing with its outer periphery terminating above and very close to the upper edge of said outer vertical portion, and a depending vertical portion spaced radially inwardly and extending down nearly into contact with the top of said disc, whereby said stationary housing and said rotating housing cover member and the outer portion of said disc substantially enclose a sterilizing chamber, said cover member having means defining a series of container-guiding pockets that each pick up a container at said inlet and carry it to said outlet; a series of first heaters carried by said cover member, each immediately above a said pocket for sending heat generated in situ down into the open top of a container in said pocket; a series of second heaters carried by said cover member each centered with respect to a pocket for sending heat generated in situ out against the vertical side walls of a container in said pocket; and a ribbon-type third heater supported in said chamber by said stationary housing and directing heat generated in situ upwardly upon the bottoms of said containers along their path between said inlet and outlet.

15. A container sterilizer for use in aseptic canning of presterilized products into a sterilized container, including in combination: a supporting frame; a vertical shaft journaled in said frame; means for rotating said shaft; a disc rotatably supported concentric to said shaft and having a circular stepped outer periphery providing a narrow ledge; means for rotating said sleeve at approximately twice the speed of said shaft; a stationary annular housing, J-shaped in cross section, supported by said frame, having an outer vertical portion spaced radially outwardly from said disc and having a guide ring along its inner wall on a level with said disc and having a stepped circular inner periphery providing a narrow ledge spaced apart from and level with the ledge of said disc so that a container can ride along supported by and guided by said ledges with the bottom of the container largely unsupported, said housing having container inlet means and container outlet means through said outer housing portion, said housing having an inner shorter vertical portion connected to said outer wall by a bottom wall and extending up to a point closely adjacent the lower surface of said disc; a housing cover member comprising a wheel fixed to said shaft for rotation therewith and having an outer housing portion generally shaped in cross section like an inverted L with a horizontal portion covering said stationary housing with its outer periphery terminating just above the upper edge of said outer vertical portion, and a depending vertical portion spaced radially inwardly and extending down vertically to just above the upper surface of said disc, whereby said stationary housing and said rotating housing cover member and the outer portion of said disc substantially enclose a sterilizing chamber, said cover member having means projecting radially outwardly from said vertical portion to define a series of container-guiding pockets that each pick up a container at said inlet and carry it to said outlet; a series of first heaters carried by said cover member, each immediately above a said pocket for sending heat generated in situ down into the open top of a container in said pocket; a series of second heaters carried by said cover member, each centered with respect to a pocket for sending heat generated in situ out against the vertical side walls of a container in said pocket; and a ribbon-type third heater supported in said chamber by said stationary housing and directing heat generated in situ upwardly upon the bottoms of said containers along their path between said inlet and outlet.

16. A container sterilizer for use in aseptic canning of presterilized products into a sterilized container, including in combination: a supporting frame; a vertical shaft journaled in said frame; means for rotating said shaft; a sleeve rotatably mounted on said shaft and having a disc rigidly secured thereto with a stepped circular outer periphery providing a narrow ledge; means for rotating said sleeve at approximately twice the speed of said shaft; a stationary annular housing that is J-shaped as seen in cross section having an outer vertical portion extending above and below said disc and spaced radially outwardly therefrom and having a pair of guide rings along its inner wall, a lower said guide ring being on a level with said disc and having a stepped circular inner periphery providing a narrow ledge spaced apart from and level with the ledge of said disc so that a container can ride along with edges supported by and guided by said ledges and with the bottom of the container largely unsupported, an upper said guide ring being spaced above said lower guide ring and adapted to engage the upper end of the container, said housing having container inlet means and container outlet means through the wall of said outer housing portion, said housing having an inner shorter vertical portion connected to said outer portion by a bottom wall and extending up to a point closely adjacent the lower surface of said disc and radially inside the outer periphery of said disc; a housing cover member comprising a wheel fixed to said shaft for rotation therewith and having an outer housing portion generally shaped in cross section like an inverted L with a horizontal portion covering said stationary housing, its outer periphery terminating beyond the inner wall of said outer housing portion and very close to the upper edge of said outer portion, and a depending vertical portion spaced radially inwardly within the outer periphery of said disc and extending down vertically approximately to the upper surface of said disc, whereby said stationary housing and said rotating housing cover member and the outer portion of said disc substantially enclose a sterilizing chamber, said cover member having fingers projecting radially outwardly from said vertical portion to define a series of container-guiding pockets that each pick up a container at said inlet and carry it to said outlet; a series of first heaters carried by said horizontal portion, each immediately above a said pocket for sending heat generated in situ down into the open top of a container in said pocket; a series of second heaters carried by said depending vertical portion each centered with respect to a pocket for sending heat generated in situ out against the vertical side walls of a container in said pocket; and a ribbon-type third heater supported in said chamber by said stationary housing and directing heat generated in situ upwardly upon the bottoms of said containers along their path between said inlet and outlet, the difference in rotational speeds between said shaft with its cover member and pockets and said sleeve with its disc and ledge, serving to spin said containers around to expose their rotating side walls to the heat from said second heaters and to aid in evenly applying the heat from said first and third heaters.

17. The sterilizer of claim 16 in which said heaters are gas burners.

18. The sterilizer of claim 16 in which said heaters are electrical elements.

19. A container-cover sterilizer for use in aseptic canning of presterilized products into a sterilized container, including in combination: a stationary, annular housing, rectangular in cross section with outer and inner vertical walls, having inlet and outlet means in top and bottom walls, respectively, and an annular slot-like opening through the said inner vertical wall and extending substantially the length thereof and having a guide way projecting inwardly from the outer vertical wall with a stepped, annular, inner periphery providing a narrow ledge; a disc-like, circular turret encompassed by the housing, rotatable in a horizontal plane and having radially projecting fingers extending through the said annular slot-like opening and into the housing to form pockets for reception of container covers; a disc-like, circular guide wheel rotatable in a horizontal plane, encompassed by the housing and positioned immediately beneath the turret and having a stepped circular outer periphery extending through the said annular slot-like opening and into the housing, said stepped periphery providing a narrow ledge spaced apart from and level with the ledge of the guide way so that the container cover edges are supported by and bridge between said ledges, with the bottoms of the covers being largely between said ledges and unsupported; a container-cover feeder magazine positioned above said inlet means for storing and feeding a supply of covers to the said pockets; a vertical cover-holding unit, circular in cross section, positioned beneath the said outlet means for receiving and storing the sterilized covers, having a helical-type heater positioned inside the walls; a ribbon-type heater supported in the housing and positioned to direct heat generated in situ upwardly upon the bottoms of the covers along their path between said inlet and outlet; means for rotating said turret; and means for rotating said guide wheel at a speed approximately twice that of said turret.

20. Apparatus for the sterilization and filling of containers for sterile food products comprising: means for continuously transporting open, empty, upright containers through a series of four treating means, all at atmospheric pressure and all providing a sterile atmosphere and joined by means providing a sterile atmosphere, said treating means comprising: first, means for rapidly heating the containers to bring the major portions thereof to a sterilizing temperature; second, temperature equalizing and holding means for maintaining said heated containers in an atmosphere at said sterilizing temperature for a period of time sufficient to equalize the temperature of the containers and to sterilize the same; third, means for filling said heated sterilized containers with presterilized food products, and fourth, means for closing said filled containers with covers and sealing the covers to them.

21. Apparatus for canning presterilized food products comprising: means for heating in situ a continuous series of open, empty, upright containers to a sterilizing temperature by means for directly impinging gas flames on to their surfaces, means for maintaining these containers at said sterilizing temperature for a period of time sufficient to equalize their temperatures and to thoroughly sterilize them, means for filling the empty sterile containers with presterilized food products, means for applying a sterile lid to the tops of the filled sterile containers, and means for sealing said sterile lid to said container.

22. Apparatus for canning presterilized food product in a sterile atmosphere, employing in situ generated heat, comprising: first, second, third, and fourth sterile areas, means for introducing unsterilized open empty upright containers into said first sterile area, electrical heating elements in said first and second sterile areas for directly heating said containers, means for moving said heated containers through said first and second sterile areas while using said heating elements to heat said containers to and maintain them at a sterilizing temperature for a predetermined period of time, means for transporting said heated sterilized containers into said third sterile area, means in said third sterile area for filling said containers with presterilized food product, means for maintaining said containers and their contents in sterile condition and for transporting them into said fourth sterile area, means in said fourth sterile area for closing and sealing said containers, and means for maintaining a sterile atmosphere in all said sterile areas through which the sterile containers travel.

23. In apparatus for canning presterilized food products, having means for sterilizing empty containers, means for filling the sterilized containers with presterilized food products, and means for sealing the filled sterilized containers with sterilized covers, the improvements comprising: means for maintaining the entire path of travel of the containers from the sterilizing means through the sealing means at atmospheric pressure and in a sterile condition, including means for generating dry heat in situ in said path and means for applying said heat in an amount sufficient to preclude any contamination of the area by unsterile air.

24. Apparatus for aseptic canning of presterilized food products and the like at atmospheric pressure, comprising a container sterilizer having means for generating heat in situ, closely adjacent the containers and for applying said heat at atmospheric pressure directly to the interior and exterior walls of the containers; a container filler; container closing means for placing sterile covers on said containers and sealing them thereto; conveyor means causing continuous passage of containers serially through said container sterilizer, said filler, and said closing means; and means for maintaining sterile conditions at atmospheric pressure throughout the apparatus until the covers have been applied and sealed to the containers.

25. The apparatus of claim 24, wherein the means for generating heat in situ comprises a series of burners designed to burn combustible gaseous fuel so that the flame is impinged directly onto surfaces of said containers.

26. The apparatus of claim 24, wherein the means for generating heat comprises a series of electrical heating units radiating heat directly to said containers.

27. The apparatus of claim 24, wherein means are provided in said container sterilizer for revolving each said container about its principal axis, to maintain them in continuous rotation while the in-situ-generated heat is being applied to them.

28. The apparatus of claim 24, wherein the means for generating heat in situ comprises a series of individual heating units, means for positioning at least one heating unit closely adjacent each container, and means to move each said unit with its said container through said container sterilizer.

29. The apparatus of claim 28, wherein the means for generating heat in situ includes one said heating unit above and one said heating unit along the side of each container, moving with said container.

30. The apparatus of claim 29, wherein said means for generating heat in situ also includes underneath heating means positioned to direct heat upwardly at the bottoms of the containers.

31. The apparatus of claim 28 having means for lowering a said heating unit into and raising it out of each container while said container is in said container sterilizer.

32. The apparatus of claim 24, wherein the container filler includes walls defining a filling chamber, and means for continuously cooling the containers as they pass through the chamber, said means comprising a hollow, annular water-jacket, L-shaped in cross-section and projecting from a said wall of the chamber inside said chamber and forming a track upon which the containers travel as they progress through the chamber and a guard rail for said containers, said guard rail of said water-jacket being provided with a plurality of openings near the bottom thereof, to enable escape of some water of said jacket onto said track.

33. The apparatus of claim 32, wherein the container filling chamber contains heating means comprising a continuous heating unit extending from the entrance of the chamber to the exit thereof and generating heat in situ to provide a sterile atmosphere in said container-filling chamber.

34. For use in sterilizing empty containers to be filled with a pre-sterilized food product, a container heater-sterilizer chamber of circular shape having a stationary housing portion with an entrance and an exit; a revolving disc-like plate to transport the containers from said entrance substantially completely around the inside periphery of said chamber to said exit; a revolving cover member for said housing portion; and a series of in situ heating devices projecting downwardly from said cover member toward the open top of the containers, one device being positioned directly above each container and moving therewith.

35. For use in aseptic canning of presterilized food, a circular container-filling chamber with an entrance and and an exit and with a rotatable portion having means for continuously receiving sterilized containers at its entrance and transporting them around to the exit thereof, radially spaced tubular food-dispensing conduits connected to a supply of presterilized food product and mounted in said rotatable top with their dispensing ends positioned immediately above said container-receiving means, one dispensing end for each said container-receiving means; an annular water jacket mounted in said container-filling chamber, shaped to provide horizontal and vertical portions for guiding the containers around said chamber as well as to provide cooling therefor, and means for maintaining a sterile atmosphere in said chamber.

36. The apparatus of claim 35, wherein said water jacket has a series of openings in its vertical portion adjacent the horizontal portion for providing a small stream of sterile water from the jacket to flow along the bottom edges of the containers.

37. The apparatus of claim 35, having a central stopcock type valve affixed to the center of the top surface of the rotatable portion with a horizontal arcuate opening extending partially around the circumference of the valve and connecting with the food product dispenser conduits in such a manner that food product passes therethrough only at a certain area thereof.

38. A circular container closing and sealing chamber with an entrance and an exit and containing a rotatable turret for receiving and transporting sterile containers filled with a sterilized food product through the said closing and sealing chamber, a series of devices for generating heat in situ, positioned closely adjacent the path of the containers and facing the sides of said containers, and means for placing sterile covers on the containers and sealing them thereto.

39. The apparatus of claim 38, wherein the devices for generating heat in situ are positioned to direct their heat at the top edge of the containers and the wall closely adjacent thereto.

References Cited in the file of this patent

UNITED STATES PATENTS

| | | |
|---|---|---|
| 2,029,303 | Ball | Feb. 4, 1936 |
| 2,091,263 | Ball | Aug. 31, 1937 |
| 2,296,828 | Ball | Sept. 29, 1942 |
| 2,514,027 | Clifcorn et al. | July 4, 1950 |
| 2,549,216 | McK. Martin | Apr. 17, 1951 |
| 2,575,863 | Clifcorn | Nov. 20, 1951 |
| 2,685,520 | McK. Martin | Aug. 3, 1954 |
| 2,771,644 | Martin | Nov. 27, 1956 |
| 2,824,344 | Abrams | Feb. 25, 1958 |
| 2,869,300 | Stover | Jan. 20, 1959 |
| 2,870,024 | McK. Martin | Jan. 20, 1959 |
| 2,875,564 | Werge et al. | Mar. 3, 1959 |